US 6,559,865 B1

(12) United States Patent
Angwin (10) Patent No.: US 6,559,865 B1
(45) Date of Patent: May 6, 2003

(54) COMPUTING SIGN TEXT FOR BRANCHES OF AN ELECTRONIC MAP NETWORK

(75) Inventor: George T. Angwin, Montara, CA (US)

(73) Assignee: Tele Atlas North America, Inc., Menlo Park, CA (US)

( * ) Notice: Subject to any disclaimer, the term of this patent is extended or adjusted under 35 U.S.C. 154(b) by 0 days.

(21) Appl. No.: 09/574,114

(22) Filed: May 19, 2000

Related U.S. Application Data (60) Provisional application No. 60/135,266, filed on May 21, 1999.

(51) Int. Cl.[7] .............................. G06F 3/14; G06F 19/00
(52) U.S. Cl. ........................ 345/765; 345/854; 340/990; 701/208; 701/209
(58) Field of Search ................................ 345/765, 764, 345/853, 854, 705, 708, 711, 715, 808, 440; 340/990, 995, 996; 701/201, 202, 208, 209, 211

(56) References Cited

U.S. PATENT DOCUMENTS

| | | | | |
|---|---|---|---|---|
| 4,796,191 A | * | 1/1989 | Honey et al. | 701/201 X |
| 4,914,605 A | * | 4/1990 | Loughmiller, Jr. et al. | 701/208 X |
| 5,311,195 A | * | 5/1994 | Mathis et al. | 342/357.14 |
| 5,402,120 A | * | 3/1995 | Fujii et al. | 701/209 |
| 5,470,233 A | | 11/1995 | Fruchterman et al. | 434/112 |
| 5,515,283 A | | 5/1996 | Desai et al. | 364/443 |
| 5,848,373 A | | 12/1998 | DeLorme et al. | 701/200 |
| 5,925,090 A | | 7/1999 | Poonsaengsathit | 701/211 |
| 5,928,308 A | * | 7/1999 | Nanba et al. | 701/211 |
| 5,948,043 A | * | 9/1999 | Mathis | 701/208 |
| 5,974,357 A | | 10/1999 | Poonsaengsathit | 701/210 |
| 6,016,485 A | * | 1/2000 | Amakawa et al. | 701/201 X |
| 6,018,697 A | * | 1/2000 | Morimoto et al. | 701/209 |
| 6,226,590 B1 | * | 5/2001 | Fukaya et al. | 701/209 |
| 6,253,153 B1 | * | 6/2001 | Kantani et al. | 701/209 |

OTHER PUBLICATIONS

Buxton, J.L., Honey, S.K., Suchowerskyj, W.E. and Tempelhof, A., "The Travelpilot: A Second–Generation Automotive Navigation System," *IEEE Transactions of Vehicular Technology*, vol. 40, No. 1, Feb. 1991, pp. 41–44.

Deretsky, Z. and Rdony, U., "Automatic Conflation of Digital Maps," Vehicle Navigation and Information Systems Conference, 1993, *Proceedings of the IEEE–IEE*, pp. 16, A–27 to A–29.

Sweeney, L.E., Jr., "Comparative Benefits of Various Automotive Navigation and Routing Technologies," Position Location and Navigation Symposium, 1996, *IEEE 1996*, pp. 415–421.

Zavoli, W.B., "Navigation and Digital Maps Interface for Fleet Management and Driver Information Systems," Vehicle Navigation and Information Systems Conference, 1989, Conference Record, pp. A9 to A–14.

Zavoli, W.B., Sheldrick, M. and Sweeney, L.E., "A System View of Digital Road Map Databases in an IVHS with Emphasis on Subsystem Interface Requirements," The 3rd International Conference on Vehicle Navigation and Information Systems, 1992, INVS, pp. 600–607.

State of California, Business and Transportation Agency, Department of Transportation, *Traffic Manual, Chapter 4—Signs*, 1998, pp. 4–70 to 4–129.

* cited by examiner

*Primary Examiner*—Raymond J. Bayerl
(74) *Attorney, Agent, or Firm*—Fliesler Dubb Meyer & Lovejoy LLP (57) ABSTRACT

A method and apparatus for computing sign text for exit ramps from limited access highways of an electronic map network. First and second name lists containing names of road elements ahead of and behind respective simple and compound exit ramps are generated. Sign text for simple exit ramps is computed using a first process having the first and second name lists as inputs. Sign text for compound exit ramps is computed using a second process having the first and second name lists as inputs.

46 Claims, 8 Drawing Sheets

COMPUTING SIGN TEXT FOR BRANCHES OF AN ELECTRONIC MAP NETWORK

CROSS-REFERENCE TO RELATED APPLICATION

This application claims the benefit of U.S. Provisional Application No. 60/135,266, filed May 21, 1999 expired.

BACKGROUND OF THE INVENTION

1. Field of the Invention

The present invention is related to computing sign text for branches of an electronic map network.

2. Description of the Related Art

Computers have revolutionized the idea of modeling a system for enhanced study and use of the system. One example is the modeling of a system as a network. A network is defined in its most general sense as something that includes a number of paths that interconnect or branch out. Many systems that involve decisions can be modeled as a network. For example, a manufacturing process or a system for providing medical treatment can be modeled as a network of decision points and actions between decision points. This network can be represented in electronic form and stored on a processor readable storage medium so that software can be created for using the network model to study or use the system.

An example of a useful network that can be stored in electronic form is an electronic map. The electronic map includes geographically referenced electronic data quantifying a physical, social, or economic system. The range of information included in an electronic map is virtually unlimited. For example, an electronic map of roads could include distances between elements, travel time, lot numbers, tax information, tourist information, processing time, waiting time, etc. Additionally, storing a map on a computer allows for a plethora of software applications to manipulate map data on the file.

Electronic maps, as well as other networks, can also be used for pathfinding, which is a method for computing a route between an origin and a destination. Some pathfinding systems compute a recommended route and guide the driver by highlighting the recommended route on a map display, or by giving turn-by-turn directions (via paper or display), or both. An electronic map that is used for pathfinding must carry information about the connectivity of a road network. In other words, the electronic map must contain information about the ways in which given road elements do or do not connect to each other (e.g., where there are ordinary intersections, where there are overpasses, where turns are restricted, etc.). A more detailed discussion regarding a system for pathfinding in an electronic map of roads can be found in U.S. Pat. No. 6,016,485, to Amakawa et al., incorporated herein by reference.

As costs for pathfinding systems continue to decrease, increasing numbers of drivers are purchasing car navigation systems for their commercial and personal vehicles. However, a pathfinding or car navigation system is useful only if the driving directions it offers are accurate. It is thus necessary to provide drivers not only with accurate path from the requested origin to the requested destination, but also accurate sign text for all guide signs (e.g., ramps, turns, etc.) along the path. To ensure the greatest possible accuracy, sign text for guide signs has traditionally been obtained by driving down the highway or freeway of interest and actually photographing the guide signs at each exit ramp. The sign text so obtained would then be incorporated into, for example, an electronic map of roads for use with a pathfinding or car navigation system.

The time and expense associated with this prior art approach in determining sign text are significant disadvantages. Moreover, there are instances where there are no signs to photograph as when the sign is missing. Accordingly, there is a need for a simple and inexpensive means for computing sign text for guide signs on exit ramps from limited access highways and freeways and for the branches from other carriageways.

SUMMARY OF THE INVENTION

The present invention, roughly described, provides a method of computing sign text for exits of a carriageway of a processor readable representation of a network. A first process is used to compute sign text for simple exit ramps of the carriageway and a second process is used to compute sign text for compound exit ramps of the carriageway. The first and second processes select route identifiers and/or street names from road elements in the network and carry them in a first and second name list. The first name list represents route identifiers and/or street names on a road element that crosses the carriageway ahead of the exit ramp for which sign text is to be computed by a distance parameter that is adjustable. The second name list represents route identifiers and/or street names on a road element that crosses the carriageway behind the exit ramp for which sign text is to be computed by another distance parameter that is also adjustable.

In accordance with the first process, if the simple exit ramp or simple ramp is identified by a route identifier, the route identifier is placed into a sign text variable without a directional. Otherwise, it must be determined whether a street name or a route identifier identifying a first road element connected to the end of the exit ramp matches a name or an entry in the first and second name lists. If there is a match, the matching street names or route identifiers are appended to the sign text variable. If there is no match, then it is further determined whether a second road element crossing the carriageway or highway ahead of or behind the exit ramp has a higher road class than that of the first road element. If the road class of the second road element is greater than that of the first road element then the name in the first name list is place into the sign text variable. Otherwise, the name list for the road element having the highest road class connected to the end of the exit ramp is placed in the sign text variable.

It must then be determined whether traffic exiting the simple exit ramp and continuing along the first road element proceeds in only one direction. If the sign text variable has a route identifier derived from a road element that connects to the end of the exit ramp, and if traffic exiting the ramp can proceed in only one direction along that road element, then a route directional is appended to the route identifier. If, however, the sign text variable has a street name derived from a road element that connects to the end of the exit ramp and if traffic exiting the exit ramp can proceed in only one direction along that road element, than a cardinal direction is appended to the street name. The compound sign text is subsequently outputted to a display.

In accordance with the second process for computing sign text for a compound exit ramp, the sign text for each leaf ramp of the compound exit ramp is computed using the first process. Then, working backwards from the leaf ramps, sign text for each fork of the compound exit ramp is computed.

If both branches of the fork have the same names in their respective sign text variables, then the common value of the sign text variables for the branches of the fork is placed into the fork handle sign text variable. Otherwise, the sign text for both branches of the fork are combined into the fork handle sign text variable. Duplicate street names or route identifiers from the fork handle sign text variable are then removed and different versions of the same route identifier or the same name in the fork handle sign text is merged into a general version of the route identifier and the street name. The computed sign text is subsequently outputted to a display.

In one embodiment of the present invention, the sign text for respective exit ramps of the processor readable representation of a network is computed in real-time, in conjunction with a user initiated request to a system for finding a path between an origin and a destination in an electronic map of roads. In another embodiment of the present invention, the sign text for respective exit ramps of the processor readable representation of a network is computed and stored in a database.

The present invention can be accomplished using hardware, software, or a combination of both hardware and software. The software used for the present invention is stored on one or more processor readable storage media including hard disk drives, CD-ROMs, optical disks, floppy disks, RAM, ROM, or other suitable storage devices. In alternative embodiments, some or all of the software can be replaced by dedicated hardware including custom integrated circuits, gate arrays, FPGAs, PLDs, and special purpose computers.

These and other objects and advantages of the invention will appear more clearly from the following detailed description in which the preferred embodiment of the invention has been set forth in conjunction with the drawings.

DETAILED DESCRIPTION

The present invention may be implemented in hardware and/or software. In one implementation, the present invention may comprise a dedicated processor including processor instructions for performing the functions described herein. Circuits may also be developed to perform the functions described herein. In one embodiment, the present invention is part of a pathfinding system. The pathfinding system can be a general purpose computer with pathfinding software, or map software, or a navigation system. Examples of navigation systems are described in U.S. Pat. No. 4,796,191, to Honey et al., U.S. Pat. No. 4,914,605, to Loughmiller, Jr. et al., U.S. Pat. No. 5,311,195 to Mathis et al., and U.S. Pat. No. 5,948,043, to Mathis, all of which are incorporated herein by reference. In another implementation, the present invention includes a plurality of computer executable instructions for implementation on a general purpose computer system. Prior to loading into a general purpose computer system, the software may reside as encoded information on a computer readable medium, such as a magnetic floppy disk, magnetic tape, and compact disc read only memory (CD-ROM).

A simple exit ramp (synonymous with a simple ramp and a simple branch) is an exit ramp that begins on one of the carriageways of a limited access road and ends at a destination roadway (i.e., a surface street or a carriageway of another limited access road). By definition, a simple ramp is an exit ramp that has no branching. A carriageway is a single roadway physically separated from other carriageways while a limited access road is a road which can be entered only via a ramp or slip road and can be exited only via a ramp or slip road. A limited access road has no crossings at grade, no driveway entrances, and is usually made up of two carriageways carrying traffic in opposite directions.

A "splitter" is an example of a leaf ramp or simple ramp that has a small traffic island at its junction with a surface street for the purpose of channelling traffic onto the two directions along the surface street. A compound exit ramp (synonymous with a compound ramp or a compound branch) is an exit ramp that forks one or more times before reaching a destination roadway. At each fork, other than the first fork, the chain of road elements entering the fork from the previous fork is called the fork handle, and the two chains of road elements leaving it are called the left branch and the right branch. The left or right branches of respective forks can extend either to the next fork or to a destination roadway at the end of the ramp.

A leaf ramp of a compound ramp is a road element that ends at one of the destination roadways. For example, if a compound ramp forks just once, each branch of the fork is a leaf ramp. By itself, a leaf ramp is a simple ramp. Thus, a splitter forms a single leaf ramp, not a fork with two leaf ramp branches. When viewed as a tree structure, the graph of a compound ramp has several leaves. However, not all leaves are leaf ramps because a leaf of the graph may connect back to the same limited access carriageway from which the ramp began (i.e., a parallel ramp). The terms fork handle and branch apply also to the forks at the beginning of simple and compound ramps. At such forks, the handle is simply the road element entering it and one fork is simply the continuation of the carriageway being exited.

Figure 1:
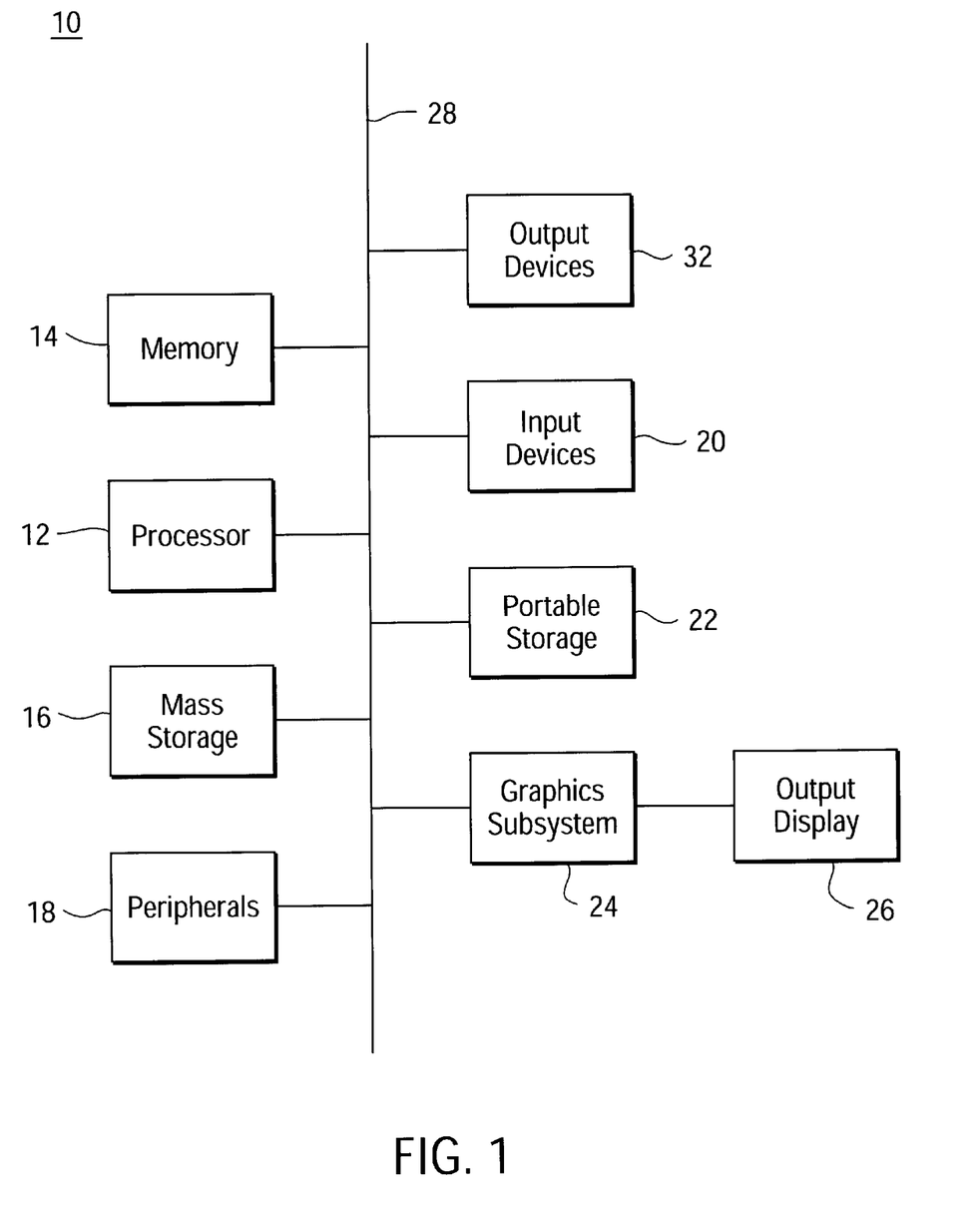
FIG. 1 is a block diagram of one exemplar hardware architecture that can be used to practice the present invention.

FIG. 1 illustrates a high level block diagram of a general purpose computer system in which the method of computing sign text of the present invention may be implemented. A computer system 10 contains a processor unit 12 and main memory 14. Processor unit 12 may contain a single microprocessor, or may contain a plurality of microprocessors for configuring the computer system 10 as a multi-processor system. Main memory 14 stores, in part, instructions and data for execution by processor unit 12. If the system for finding a path of the present invention is wholly or partially implemented in software, main memory 14 stores the executable code when in operation. Main memory 14 may include banks of dynamic random access memory (DRAM) as well as high speed cache memory.

Computer system 10 further includes a mass storage device 16, peripheral device(s) 18, input device(s) 20, portable storage medium drive(s) 22, a graphics subsystem 24, an output display 26, and output devices 32. For purposes of simplicity, the components in computer system 10 are shown in FIG. 1 as being connected via a single bus 28. However, computer system 10 may be connected through one or more data transport means. For example, processor unit 12 and main memory 14 may be connected via a local microprocessor bus, and the mass storage device 16, peripheral device(s) 18, portable storage medium drive(s) 22, graphics subsystem 24, and output devices 32 may be connected via one or more input/output (I/O) buses. Mass storage device 16, which may be implemented with a magnetic disk drive or an optical disk drive, is a non-volatile storage device for storing data and instructions for use by processor unit 12. In one embodiment, mass storage device 16 stores the system software for determining a path for purposes of loading to main memory 14.

Portable storage medium drive 22 operates in conjunction with a portable non-volatile storage medium, such as a floppy disk, to input and output data and code to and from computer system 10. In one embodiment, the system software for determining a path is stored on such a portable medium, and is input to the computer system 10 via the portable storage medium drive 22. Peripheral device(s) 18 may include any type of computer support device, such as an input/output (I/O) interface, to add additional functionality to the computer system 10. For example, peripheral device(s) 18 may include a network interface card for interfacing computer system 10 to a network, a modem, etc.

Input device(s) 20 provide a portion of the user interface for a user of computer system 10. Input device(s) 20 may include an alpha-numeric keypad for inputting alpha-numeric and other key information, or a cursor control device, such as a mouse, a trackball, stylus, or cursor direction keys. In order to display textual and graphical information, computer system 10 contains graphics subsystem 24 and the output display 26. Output display 26 may include a cathode ray tube (CRT) display, liquid crystal display (LCD) or other suitable display device. Graphics subsystem 24 receives textual and graphical information, and processes the information for output to output display 26. Output display 26 can be used to report the results of a sign text computation. Output devices 32 provide another means for reporting the results of a sign text computation. Output devices 32 may include a printer, a personal digital assistant (PDA), a modem, audio speakers, a cellular telephone or device capable of transmitting and receiving text messages, or any other device to which the results of the sign text The components contained in computer system 10 are those typically found in general purpose computer systems, and are intended to represent a broad category of such computer components that are well known in the art.

The components contained in the computer system of FIG. 1 are those typically found in general purpose computer systems, and are intended to represent a broad category of such computer components that are well known in the art. Thus, the computer system of FIG. 1 can be a personal computer, workstation, minicomputer, mainframe computer, etc. The computer can also include different bus configurations, networked platforms, multi-processor platforms, etc. Various operating systems can be used including Unix, Linux, Windows, Macintosh OS, and other suitable operating systems.

The present invention is directed to a method of computing sign text for branches of a path in a network. One example of a network suitable for use with the present invention is an electronic map of roads. For example purposes only, the present invention will be discussed with reference to an electronic map. The present invention is in no way limited to use with electronic maps, and embodiments of the present invention may be used with any type of processor readable representation of a network.

Figure 2:
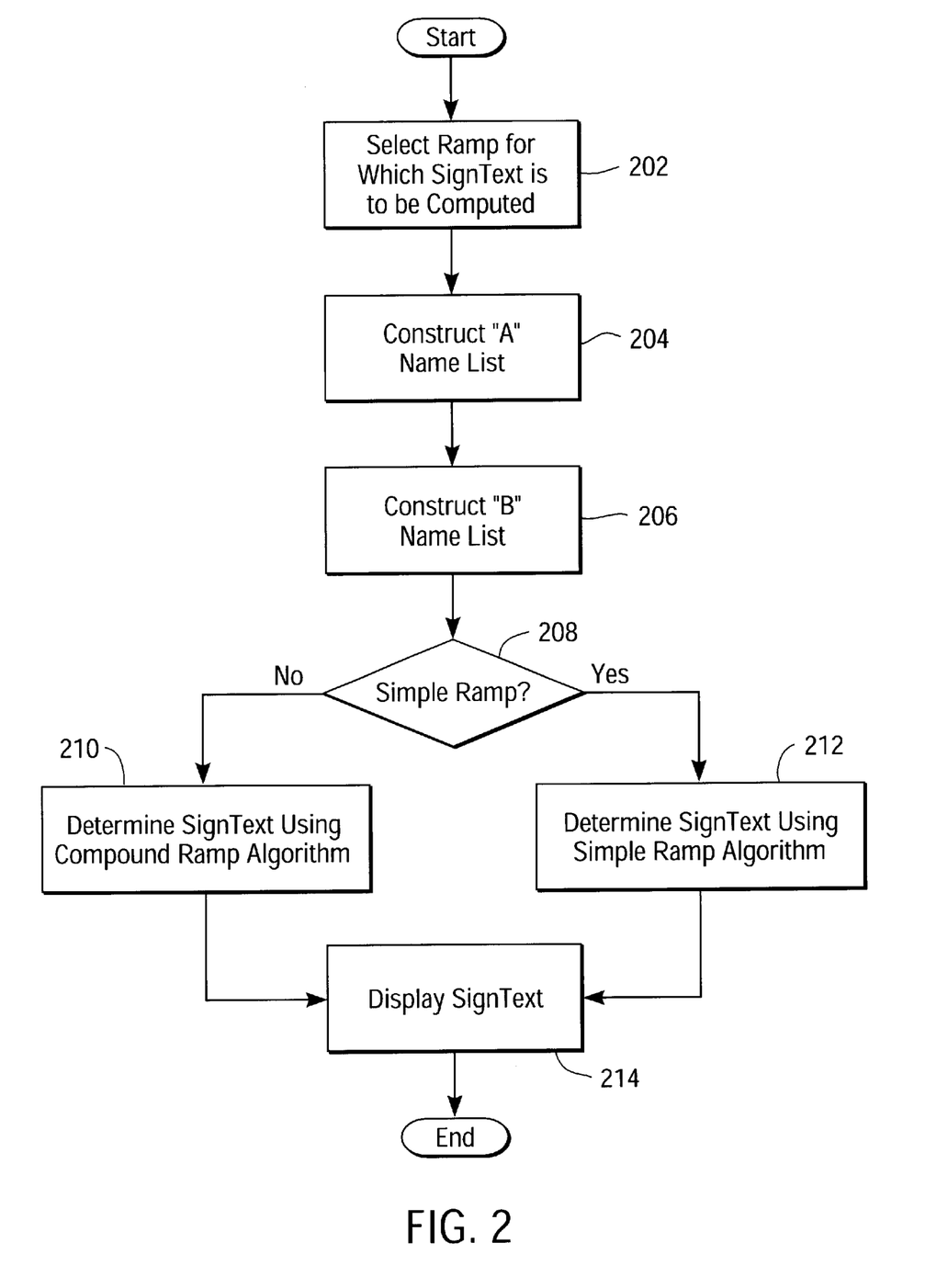
FIG. 2 is a flow chart describing a method of computing sign text for an exit ramp of a carriageway.

FIG. 2 is a flow chart describing a method of computing sign text for exit ramps of a carriageway of a processor readable representation of a network. Initially, in step 202 an exit ramp for which sign text is to be computed is selected. In step 204 a first name list or "A" name list is constructed for a first road element that crosses the carriageway at a first junction. While the name list, in general, contains the name(s) most likely to appear on a road sign at the beginning of a simple ramp (e.g., highway exit) or at a fork of a compound ramp, the A name list, in particular, contains the name(s) on the first road element that crosses the carriageway ahead of the simple ramp or ahead of the fork of the compound ramp.

The "A" in A name list stands for "ahead" because the name list is derived from the first road element ahead of the simple ramp or ahead of the fork of the compound ramp. Further, the first road element ahead of the simple ramp or fork is separated from the simple ramp or fork by a distance less than a first distance parameter, where the first distance parameter is a parameter set in advance and adjustable to the local geography. That is, the first distance parameter can be adjusted to suit either urban or rural environments. That is, the distance between the first road element and a simple ramp in a rural setting, for example, could be greater than the distance between the first road element and a simple ramp in an urban environment. In other words, this distance parameter is adjustable to accommodate changes in the spacing between successive exit ramps.

In searching for this first road element ahead of the simple ramp or ahead of the fork, the present invention searches each branch of the electronic map network in the direction of the one way arrows (See FIGS. 3A and 4A) for a road element that crosses the branch on an overpass or an underpass, skipping over a road element that is a ramp or that carries a route identifier the same as one on the branch being searched. The search stops when another highway exit or fork in the ramp is encountered. The search for a stopping fork is limited to a first distance (e.g., half a mile for urban roads and one mile for rural roads) down the carriageway. The A name list is set to NULL if there is no road element satisfying the above conditions.

The name list for a road element may contain the street name on the road element and the route identifier on the most important interstate, US, or primary state highway name of the road element, not including its directional. For example, if a road carries both "WILLOW ROAD" and "HWY 84", then the name list contains both Highway 84 and Willow Road. The name list of a road element carrying "CRIDER ROAD" and "CO HWY 92" contains only Crider Road. The name list of a road element carrying "I 74," "I 275," and "US 52" is "I 74." Finally, the name list of a road element carrying "I 80" and "I 90," contains only "I 80."

In step 206 a second name list or "B" name list is constructed for a second road element that crosses the carriageway on an overpass or an underpass and connects to the first road element of step 204 at a second junction. The B name list for an exit ramp exit or a fork in a compound ramp is analogous to the A name list, except that the search proceeds backwards against the direction of the one way arrows of FIGS. 3A and 4A. The "B" in B name list stands for "behind" because the B name list is derived from a road element behind the junction, with which it is associated, by a second distance parameter where the second distance parameter, like the first distance parameter, is set in advance and is adjustable to the local geography. The second distance parameter is also adjustable to accommodate changes in the spacing between successive exit ramps. In searching for this road element one must skip over the ramps and road elements with the matching route identifiers as with the A name list. The search stops when another highway entrance or merging ramp is encountered, or when it exceeds a second distance. The B name list is also set to NULL if there is no road element satisfying the above conditions.

Whether the selected exit ramp is a simple ramp or a compound ramp is next determined in step 208. If the selected exit ramp is a simple ramp then sign text for the selected exit ramp is computed using a first process in step 212. However, if the selected exit ramp is not a simple ramp (i.e., compound ramp) then sign text for the selected compound ramp is computed using a second process in step 210. In step 214 the sign text computed using either the first or second processes is outputted to a display.

Figure 3:
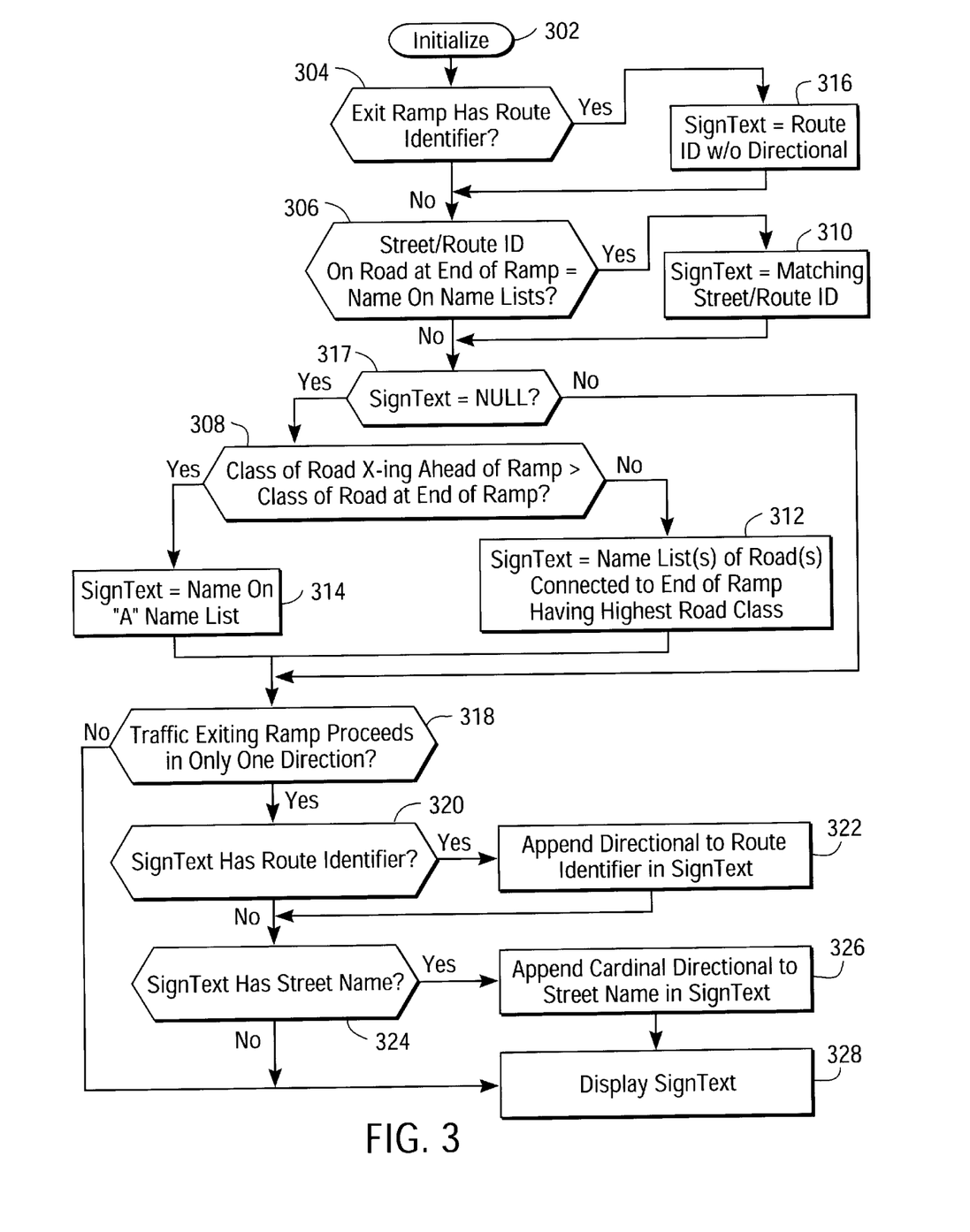
FIG. 3 is a flow chart describing a first process for determining sign text for a simple exit ramp.

FIG. 3 is a flow chart describing a first process for computing sign text for simple ramps. The process is initialized in step 302. As previously discussed with respect to FIG. 2, the A & B name lists are constructed during this initialization step. Also performed during this initialization step 302 is the initialization of a sign text variable into which the computed sign text will later be placed. In step 304, the process determines whether the ramp has a route identifier by looking on the ramp itself for a route identifier. If the ramp has a route identifier then the route identifier, without directional, is placed into the sign text variable. This is because the route identifier is the most reliable way to identify a ramp or a path. In step 306, if the exit ramp does not have a route identifier then the process determines whether a route identifier or a street name identifying a first element connected to the end of the simple ramp at a first junction matches a name in the A or B name lists. If there is a match, the matching street name and or route identifier is placed in the sign text variable in step 310. This is because there is a high probability that a name on a nearby overpass, for example, that matches one on a connecting road refers to an important road to which the ramp leads.

If the exit ramp does not have a route identifier and the street name or road identifier on the first road element connected to the end of the simple ramp does not match a name on the A name list or B name list, then the sign text variable is still empty or NULL. If, according to step 317, the sign text variable is empty, then step 308 determines whether a road class of a second road element connected to the first road element at second junction is higher than a road class of the first road element. Thus, if a road crossing ahead of the ramp has a higher road class than any of the road elements connected to the end of the ramp then, in step 314, the names in the A name list is placed into the sign text variable. Otherwise, in step 312, the name of the road element having the highest road class connected to the end of the ramp is placed in the sign text variable. If there is more than one road element having the highest road class, the combined name list from all those road elements are placed in the sign text variable.

At this point in the process, the sign text variable contains either a route identifier without directional, a name in the A name list, a street name or route identifier that matches a name in the A or B name lists, or names from the name lists of road elements connected to the end of the ramp (i.e., connected to the first road element at the second junction) having the highest road class. If, according to step 317, the sign text variable is no longer empty, the process proceeds to step 318. In step 318, the process next determines whether traffic exiting the ramp on to a destination roadway can proceed in only one direction along that destination roadway. If traffic exiting the ramp can proceed in only one direction then the process, in step 320, determines whether the sign text variable contains a route identifier.

If the sign text variable has a route identifier derived from a road element connected to the end of the ramp and if traffic exiting the ramp can proceed in only one direction along the destination roadway then, in step 322, an appropriate route directional is appended to each route identifier sign text contained in the sign text variable. In this way, the route directional can help to distinguish between two ramps leading to the same destination roadway in which traffic travel in opposing directions.

In step 324, the process also determines whether the sign text variable contains a street name. If the sign text variable has a street name derived from a road element connected to the end of the ramp and if traffic exiting the ramp can proceed in only one direction along the destination roadway then, in step 326, an appropriate cardinal directional is appended to each street name in the sign text variable. The cardinal directional.helps to distinguish between two ramps leading to the same destination roadway (i.e., the same street) with traffic on the street traveling in opposing directions. At this point, the sign text variable will contain at least one street name or route identifier that has a high probability of naming the exit ramp unless no connecting road has a name or route identifier. This may arise either from faulty in the electronic map of roads or from an exit with no name. The sign text computed from this first process is subsequently outputted to a display in step 328.

Figure 3A:
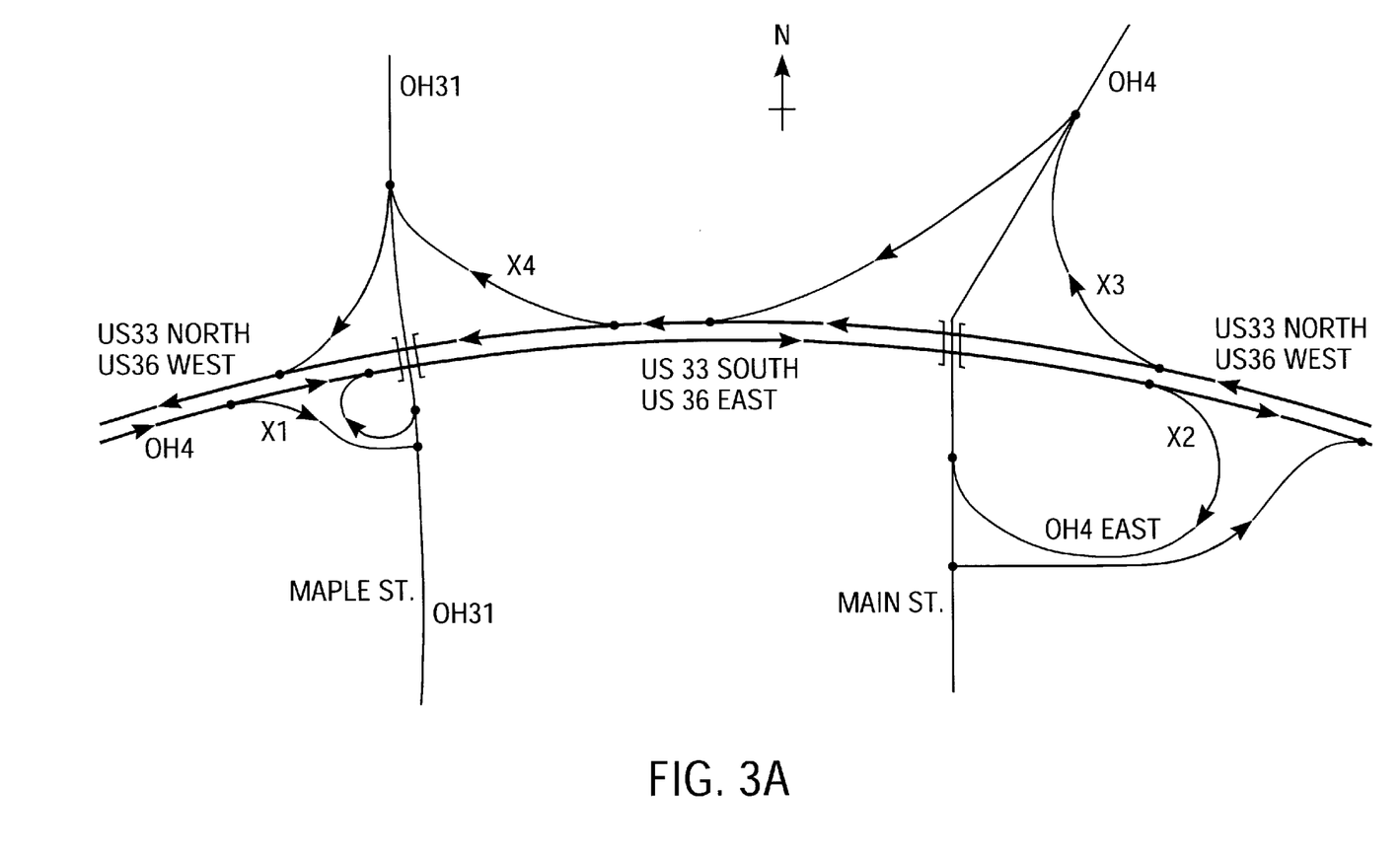
FIG. 3A illustrates the computation of sign text for exemplar simple ramps of an electronic map network using the first process.

FIG. 3A illustrates the computation of sign text for exemplar simple ramps of an electronic map network using the steps for the first process as outlined in FIG. 3. Starting with simple ramp X1, the A and B name lists are initially constructed (step 302). The A name list for ramp X1 contains "MAPLE ST" and "OH 31" (note that the B name list cannot be constructed from the information given in this example). While ramp X1 does not have a route identifier (step 304), the street name and the route identifier on the road at the end of ramp X1 matches names on the A name list (step 306). The sign text variable and the sign text for ramp X1 is thus "OH 31 " and "MAPLE ST" (step 310). The sign text variable for ramp X1 is not NULL (step 317) and nothing in FIG. 3A indicates that traffic exiting ramp X1 proceeds in only one direction (step 318). Consequently, the sign text displayed for ramp X1 is "OH 31" and "MAPLE ST" (step 328).

Similarly, the B name list for ramp X2 contains "MAIN ST" and "OH 4" (step 302). Ramp X2, like ramp X1, does not have a route identifier (step 304) and the street name and the route identifier on the road at the end of ramp X2 matches names on the B name list (step 306). The sign text variable and the sign text for ramp X2 is thus "MAIN ST" and "OH 4" (step 310). The sign text variable for ramp X2 is no longer empty (step 317) but it is inferable from FIG. 3A that traffic exiting ramp X2 (and ramps X3 and X4) can proceed in only the northbound direction on "MAIN ST" and in the eastbound direction on "OH 4" (step 318). In this case, the sign text for ramp X2 contains a route identifier (step 320) and, thus, a route directional is appended to "OH 4" (step 322). The sign text for ramp X2 also contains a street name (step 324) and, thus, a cardinal directional is appended to "MAIN ST" (step 326). Finally, the sign text displayed for ramp X2 is "OH 4 EAST" and "MAIN ST NORTH" (step 328). The sign text displayed for ramp X3, following the same steps as ramp X2, is also "OH 4 EAST" and "MAIN ST NORTH."

The A name list for ramp X4 contains "MAPLE ST" and "OH 31" (step 302). Ramp X4 does not have a route identifier (step 304) and the street name and the route identifier on the road at the end of ramp X4 matches names on the B name list (step 306). The sign text variable and the sign text for ramp X4 is thus "MAPLE ST" and "OH 31" (step 310). Thus, the sign text variable for ramp X4 is no longer empty (step 317). Again, it is inferable from FIG. 3A that traffic exiting ramp X4 can proceed in only the northbound direction on "MAPLE ST" and "OH 31" (step 318). The sign text for ramp X4 contains a route identifier (step 320) and, thus, a route directional is appended to "OH 31" (step 322). The sign text for ramp X4 also contains a street name (step 324) and, thus, a cardinal directional is appended to "MAPLE ST" (step 326). Finally, the sign text displayed for ramp X4 is "OH 31 NORTH" and "MAPLE ST NORTH" (step 328).

Figure 4:
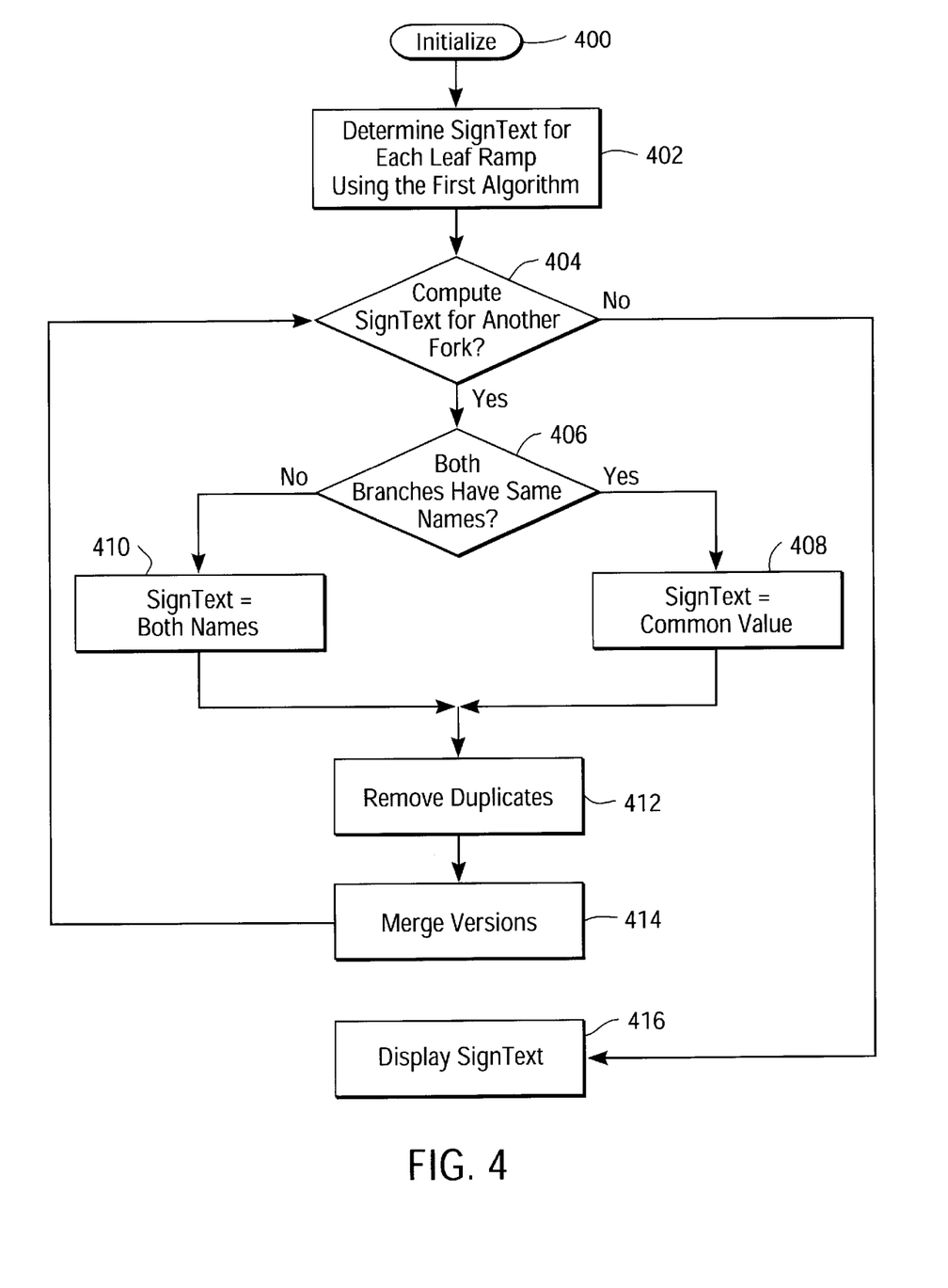
FIG. 4 is a flow chart describing a second process for determining sign text for a compound exit ramp.

FIG. 4 is a flow chart of a second process for computing sign text of compound exit ramps. This second process computes sign text for use by route directions software at the beginning of a compound ramp, where it connects to a carriageway of a limited access highway. In addition, the second process computes sign text for each branch of each fork of the compound ramp, including the leaf ramps of the compound ramp. The initialization step 400 of the second process is analogous to the initialization step 302 of the first process depicted in FIG. 3. That is, the sign text variable into which the computed sign text will later be placed is initialized, and the A and B name lists are constructed for each fork of the compound ramp. In step 402, the second process begins by determining sign text for each leaf ramp of the compound ramp.

Analogizing the compound ramp to a tree structure, step 404 is the first of a series of steps wherein the sign text for each fork of the compound ramp is computed by working backwards from the leaf ramps (i.e., at the tree) to the carriageway from which the compound ramp originated (i.e., the root of the tree). In step 406, the process determines whether the sign text computed for the left and right branches of the fork have a common name. It should be noted that the sign text variables for the left and right branches may have more than one name in common. In step 408, if the sign text computed for the left and right branches of the fork share a common name then the common name is place into the fork handle sign text variable corresponding to that fork. However, in step 410, if the sign text computed for the left and right branches of the fork do not share the common name then the combined sign text for both left and right branches are placed into the fork handle sign text variable of that fork.

Duplicate street names and/or identifiers from the fork handle sign text variables of each of the forks of the compound ramp are subsequently removed and different versions of the same street name or route identifier in the fork handle sign text variables of each of the forks of the compound ramp are merged into a more general version in steps 412 and 414, respectively. For example, in step 414, the sign text "US 30 WEST" and "US 30 EAST" in the fork handle sign text variable of a given fork would be merged into "US 30." In step 416, the compound sign text for each fork of the compound ramp is outputted to a display.

Figure 4A:
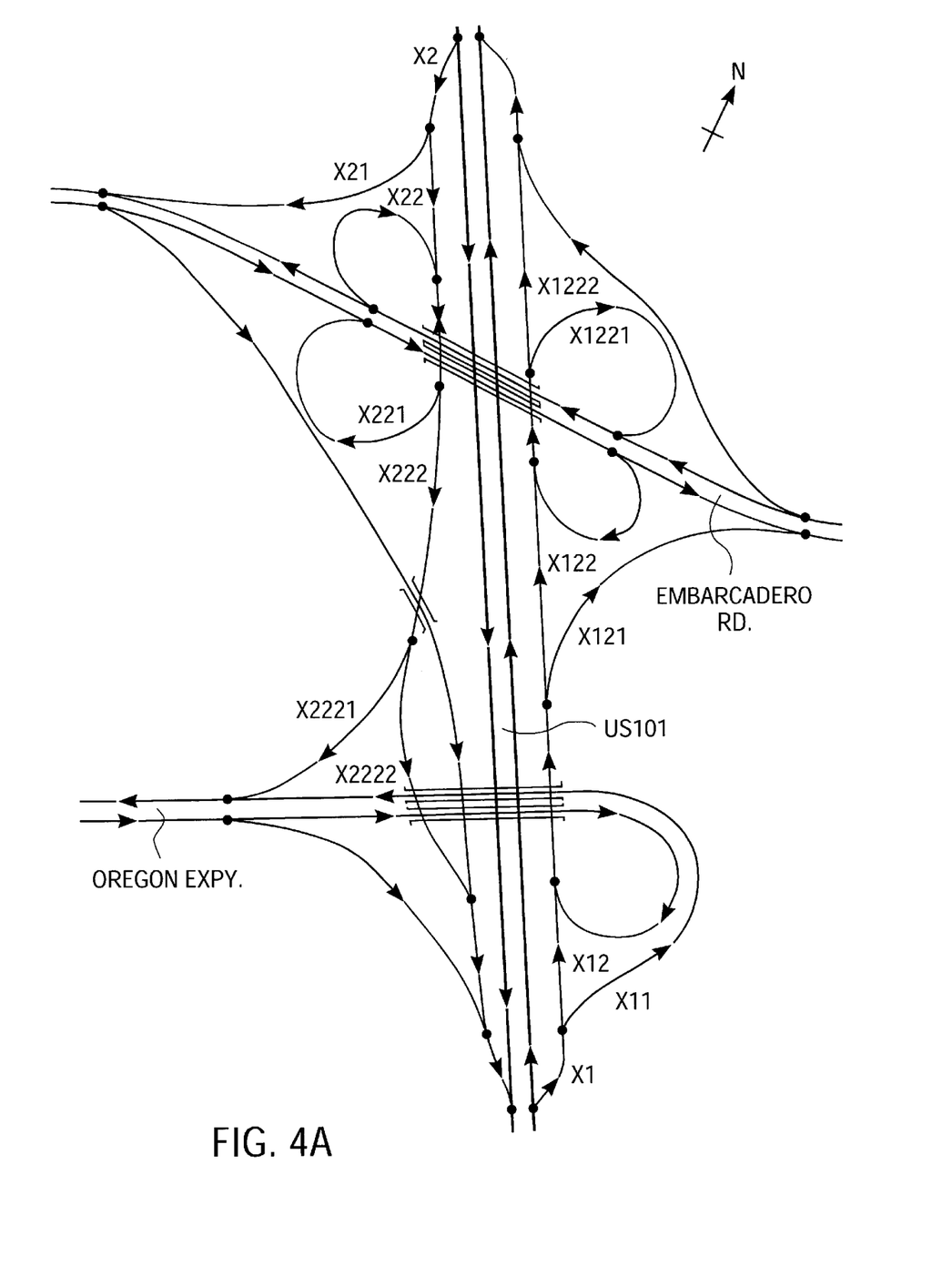
FIG. 4A illustrates the computation of sign text for exemplar compound ramps of an electronic map network using the second process.

FIG. 4A illustrates the computation of sign text for exemplar simple and compound ramps of an electronic map network using the steps for the second process as outlined in FIG. 4. The first step is to determine or compute the sign text for each leaf ramp using the first process of FIG. 3A. For example, the A name list for leaf ramp X1221 contains only "EMBARCADERO RD" (step 302). Leaf ramp X1221 does not have a route identifier (step 304) and the street name of the road at the end of leaf ramp X1221 matches a name on the A name list (step 306).

The sign text variable and the sign text for leaf ramp X1221 is thus "EMBARCADERO RD" (step 310). The sign text variable for leaf ramp X1221 is thus no longer empty (step 317) and it is inferable from FIG. 4A that traffic exiting leaf ramp X1221 can proceed in only the westbound direction on "EMBARCADERO RD" (step 318). While the sign text for leaf ramp X1221 does not contain a route identifier (step 320) it does contains a street name (step 324). Thus, a cardinal directional is appended to "EMBARCADERO RD" (step 326) and the sign text for leaf ramp X1221 is "EMBARCADERO RD WEST" (step 328). Similarly, the sign text for leaf ramp X121 is "EMBARCADERO RD EAST." The sign text for leaf ramp X11 is "OREGON EXPY WEST." The sign text for leaf ramp X2221 is "OREGON EXPY WEST." The sign text for leaf ramp X221 is "EMBARCADERO RD EAST." The sign text for leaf ramp X21 is "EMBARCADERO RD WEST."

Having computed the sign text for each of the leaf ramps of the compound ramp, the next step is to work backwards from the leaves (i.e., leaf ramps) to the root (i.e., first fork handle) of a metaphorical tree. The sign text for the fork handle X122 begins by determining whether the sign text computed for the left branch X1222 and right branch X1221 have a common name (step 406). In this case, there is no sign text for left branch X1222 and, thus, the sign text for fork handle X122 is "EMBARCADERO RD WEST" (step 410). There are no duplicate names in the sign text for fork handle X122 (step 412) and there are no different name versions to merge (step 414).

The sign text for the fork handle X12 begins by determining whether the sign text computed for the left branch X122 and right branch X121 have a common name (step 406). In this case, the sign text for leaf ramp/right branch X121 is "EMBARCADERO RD EAST." The sign text for fork handle/left branch X122 is "EMBARCADERO RD WEST." The sign text for both branches are different and, thus, the sign text for fork handle X1 is the combination of both "EMBARCADERO RD EAST" and "EMBARCADERO RD WEST" (step 410). There are no duplicate names (step 412) but there are different name versions to merge (step 414). The sign text for fork handle X12 thus becomes simply "EMBARCADERO RD."

Finally, the sign.text for the fork handle (root) X1 begins by determining whether the sign text computed for the left branch X12 and right branch X11 have a common name (step 406). In this case, the sign text for fork handle/left branch X12 is "EMBARCADERO RD." The sign text for leaf ramp/right branch X11 is "OREGON EXPY WEST." The sign text for both branches are different and, thus, the sign text for fork handle X1 is the combination of both "EMBARCADERO RD" and "OREGON EXPY WEST" (step 410). There are no duplicate names (step 412) and there are no different name versions to merge (step 414). The sign text for fork handle X1 is thus "EMBARCADERO RD" and "OREGON EXPY WEST." Once completed, the sign text computed for each of the leaf ramps and each of the forks is outputted to a display (step 416). This process is repeated for the remaining forks of the compound ramp.

Figure 5:
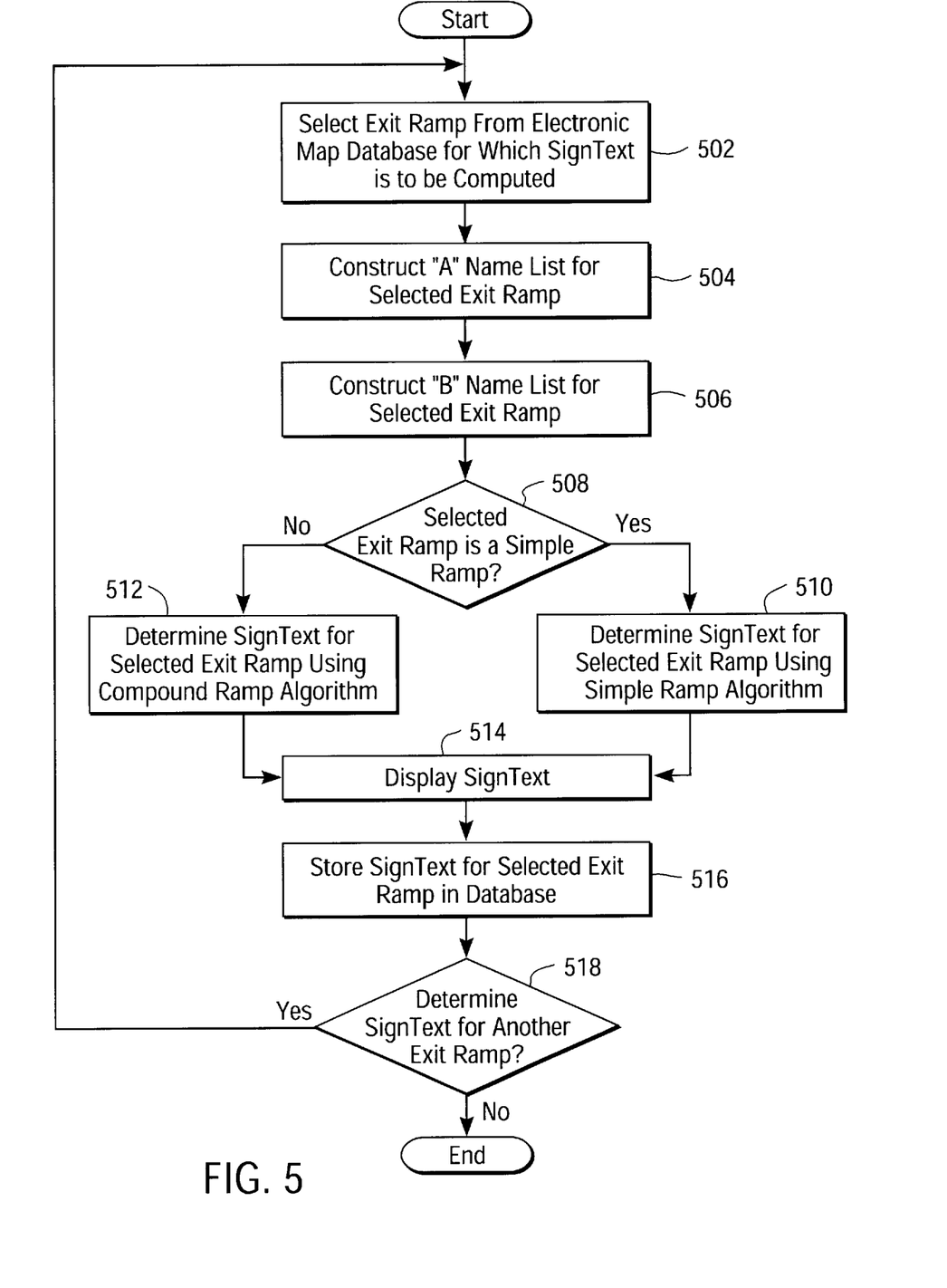
FIG. 5 is a flow chart describing a first embodiment of the present invention.

FIG. 5 is a flow chart of one embodiment of the present invention. This third process begins in step 502 with the selection of an exit ramp from an electronic map database for which sign text is to be computed. A and B name lists are then constructed in steps 504 and 506, respectively. In step 508, the process determines whether the selected exit ramp is a simple ramp or a compound ramp. If the selected exit ramp is a simple ramp then, in step 510, the sign text for the simple ramp is computed using the first process as described previously in FIG. 3. However, if the selected exit ramp is not a simple ramp (i.e., a compound ramp), then sign text for the compound ramp is determined in step 512 using the second process as described earlier in FIG. 4. The resulting sign text, computed using either the first or second processes, is then outputted to a display in step 514.

In step 516, the computed sign text could be stored either in a new database, in the existing electronic map database from which the exit ramp was selected, or in another database or storage unit. In step 518, the present invention could then be used to determine whether sign text for another exit ramp is to be computed. In this way, sign text for all exit ramps of the electronic map database could be computed and subsequently stored in the database. The database can thus be periodically updated to include any modifications or improvements to the sign text computation.

In another embodiment, a program having, for example an electronic map database as an input, could be adapted and executed in conjunction with the present invention to populate a database with sign text for all exit ramps of the electronic map database. This would enable a route direction software manufacturer to furnish customers with, for example, an electronic map database that is complete with signage for all exit ramps on the database. Alternatively, an internet map service provider (e.g., Yahoo, MapQuest, etc..) could use the present invention to, for example, provide users with sign text for exit ramps for a particular path computed by the mapping service. The computed path and sign text for exit ramps along the path could then be outputted to a printer, PDA or other output device to help guide the user/driver to a given destination.

Figure 6:
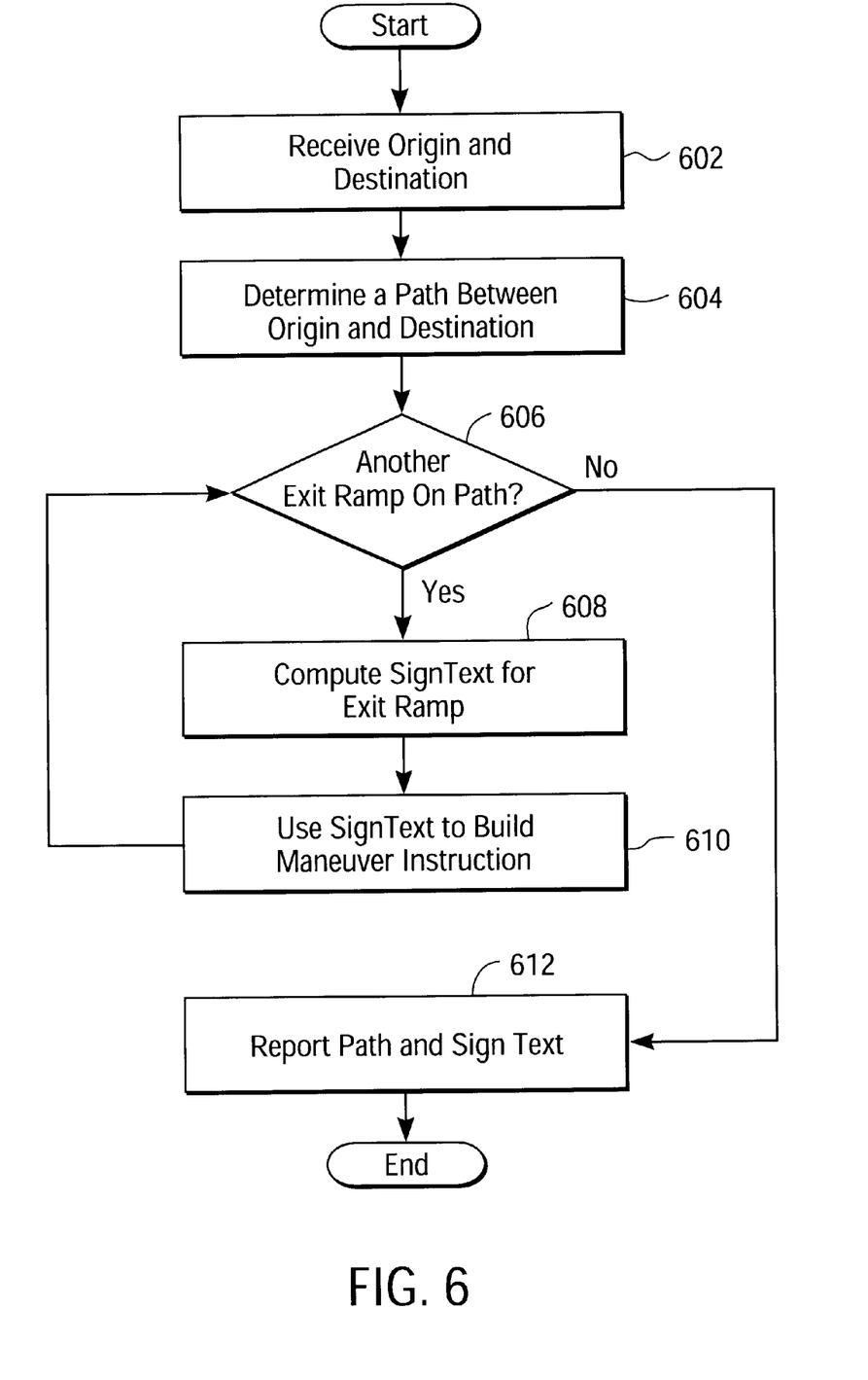
FIG. 6 is a flow chart describing a second embodiment of the present invention.

FIG. 6 is a flow chart of another embodiment of the present invention. In this embodiment, sign text for exit ramps of a carriageway of a processor readable representation of a network is computed in real time in conjunction with a user initiated pathfinding request to a system for determining a path from an origin to a destination. A more detailed discussion regarding a system for pathfinding in an electronic map of roads can be found in U.S. Pat. No. 6,016,485, to Amakawa et al., incorporated herein by reference. In step 602, the system receives an origin and a destination. In step 604, the system determines a path between the origin and the destination. Steps 606, 608 and 610 enable the sign text to be computed and used to build a maneuver instruction for each exit ramp along the path between the origin and the destination. In step 612, the computed path and sign text for the exit ramps along the path are reported to a display or to an output device which will guide a user/driver from the origin to the destination.

In other words, this embodiment of the present invention could be used together with a system to compute and output, in real time, a path from a requested origin to a requested destination and sign text for all exit ramps that may be encountered along the path. For example, in one possible implementation of the system, the sign text for a first of several exit ramps along the path could be computed and outputted to a display until the user/driver passes the first exit ramp. At this point, the sign text computed for the first exit ramp could then be removed from the system's display and the sign text for the next exit ramp could be computed and displayed until the user/driver passes the second exit ramp, and so on. This process could continue until there are no more exit ramps along the path for which sign text is to be computed or until the user/driver reaches the requested destination.

The foregoing description of preferred embodiments of the present invention has been provided for the purposes of illustration and description. It is not intended to be exhaustive or to limit the invention to the precise forms disclosed. Many modifications and variations will be apparent to practitioners skilled in this art.

The described embodiments were chosen and described in order to best explain the principles of the invention and its practical application to thereby enable others skilled in the art to understand the invention for various embodiments and with various modifications as are suited to the particular use contemplated. It is intended that the scope of the invention be defined by the following claims and their equivalents.

What is claimed is:

1. A method of computing sign text for branches from a carriageway of a processor readable representation of a network, the method comprising the steps of:

accessing the processor readable representation of a network;

selecting a branch of the processor readable representation of a network for which sign text is to be computed;

initializing a sign text variable;

constructing a first name list for a first road element that crosses the carriageway at a first junction;

constructing a second name list for a second road element that crosses the carriageway at a second junction;

computing sign text for selected branches of the processor readable representation of a network; wherein the computing step further comprises the steps of:

computing sign text for a simple branch of the processor readable representation of a network using a first process; and computing sign text for a compound branch of the processor readable representation of a network using a second process;

placing computed sign text into the sign text variable; and outputting sign text computed for selected branches of the processor readable representation of a network.

2. The method of claim 1, wherein the first name list comprises a route identifier and a street name associated with the first road element, the first road element being located a first distance ahead of the first junction.

3. The method of claim 2, wherein the first distance is adjustable.

4. The method of claim 1, wherein the second name list comprises a route identifier and a street name associated with the second road element, the second road element being located a second distance behind the second junction.

5. The method of claim 4, wherein the second distance is adjustable.

6. The method of claim 1, wherein the processor readable representation of a network is an electronic map of roads.

7. The method of claim 1, further comprising the step of:

storing the computed sign text in a database.

8. The method of claim 7 wherein the database is linked to the processor readable representation of a network.

9. The method of claim 1, further comprising the steps of:

computing a path from an origin in the processor readable representation of a network to a destination in the processor readable representation of a network;

computing sign text for branches of the processor readable representation of a network along the path; and using the computed sign text for respective branches to build respective maneuver instructions.

10. The method of claim 1, wherein sign text computed for selected branches of the processor readable representation of a network are outputted to an output device or a display.

11. A method of computing sign text for branches from a carriageway of a processor readable representation of a network, the method comprising the steps of:

accessing the processor readable representation of a network;

computing sign text for selected branches of the processor readable representation of a network; wherein the computing step further comprises the steps of:

computing sign text for a simple branch of the processor readable representation of a network using a first process; wherein the first process comprises the steps of:

determining whether a route identifier or a street name identifying a first road element connected to the simple branch at a first junction matches an entry in a first name list or a second name list;

determining whether a road class of a second road element connected to the first road element at a second junction is higher than a road class of the first road element; and determining whether traffic exiting simple branch and continuing along the first road element proceeds in only one direction;

computing sign text for a compound branch of the processor readable representation of a network using a second process; and outputting sign text computed for selected branches of the processor readable representation of a network.

12. A method of computing sign text for branches from a carriageway of a processor readable representation of a network, the method comprising the steps of:

accessing the processor readable representation of a network;

computing sign text for selected branches of the processor readable representation of a network; wherein the computing step further comprises the steps of:

computing sign text for a simple branch of the processor readable representation of a network using a first process; and computing sign text for a compound branch of the processor readable representation of a network using a second process; wherein the compound branch comprises a fork, the fork comprising a fork handle, a left branch, and a right branch; and wherein the second process comprises the steps of:

determining whether the left and right branches are leaf ramps;

computing sign text for the leaf ramps using the first process;

determining whether sign text is to be computed for other forks of the compound branch;

determining whether sign texts computed for the left and right branches have a common name;

placing the common name into the fork handle sign text if sign texts computed for the left and right branches are equivalent; and placing both sign texts into the fork handle sign text if the sign texts computed for the left and right branches are not equivalent; and outputting sign text computed for selected branches of the processor readable representation of a network.

13. The method of claim 12, further comprising the steps of:

removing duplicate names from the fork handle sign text; and merging different versions of a same route identifier or a same street name in the fork handle sign text into a general version of the route identifier and the street name.

14. A method of determining sign text for a simple ramp of a processor readable representation of a network, the method comprising the steps of:

determining whether the simple ramp is identified by a route identifier;

determining whether a street name or the route identifier identifying a first road element, connected to the simple ramp at a first junction matches an entry in first and second name lists;

determining whether a second road element connected to the first road element at a second junction has a road class higher than that of the first road element;

determining whether traffic exiting the simple ramp and continuing along the first road element proceeds in only one direction; and outputting sign text computed to a display.

15. The method of claim 14, wherein the processor readable representation of a network is an electronic map of roads.

16. The method of claim 14, further comprising the step of:

storing the computed sign text in a database.

17. The method of claim 14, further comprising the step of:

storing the computed sign text in the processor readable representation of a network.

18. The method of claim 14, wherein the first name list comprises a name of a route identifier or a street located a first distance ahead of the simple ramp.

19. The method of claim 18, wherein the second name list comprises a name of a route identifier or a street located a second distance behind the simple ramp.

20. The method of claim 19, wherein the first and second distances are adjustable to accommodate changes in a spacing between successive simple ramps.

21. The method of claim 14, wherein the sign text is computed in real time in conjunction with a step to determine a path in the network from an origin to a destination.

22. A method of determining sign text for a compound ramp of a processor readable representation of a network, the compound ramp comprising a fork, the fork comprising a fork handle, a left branch, and a right branch, the method comprising the steps of:

computing sign text for branches which are leaf ramps;

determining whether sign text is to be computed for other forks of the compound branch;

determining whether sign text computed for the left and right branches have a common name;

placing the common name into the fork handle sign text if the sign texts computed for the left and right branches are equivalent; and placing both sign texts into the fork handle sign text if the sign texts computed for the left and right branches are not equivalent.

23. The method of claim 22, further comprising the steps of:

removing duplicate names from the fork handle sign text; and merging different versions of a same route identifier or a same street name in the fork handle sign text into a general version of the route identifier and the street name.

24. The method of claim 22, wherein the left branch leads to a second fork in the compound ramp of the network.

25. The method of claim 24, wherein the right branch leads to a third fork in the compound ramp of the network.

26. A method for determining sign text of exit ramps in an electronic map of roads, the exit ramps identifying a road element from a first carriageway of a limited access road to a destination roadway, the method comprising the steps of:

selecting an exit ramp for which sign text is to be computed;

initializing a sign text variable;

constructing a first name list and a second name list;

computing sign text using a first process if the selected exit ramp is a simple ramp, the first and second name lists being inputs to the first process and the computed sign text being placed in the sign text variable;

computing sign text using a second process if the selected exit ramp is a compound ramp, the first and second name lists being inputs to the second process and the computed sign text being placed in the sign text variable; and outputting the sign text variable to a display.

27. The method of claim 26, wherein the simple ramp begins on the first carriageway of the first limited access road and ends at a destination roadway.

28. The method of claim 27, wherein the destination roadway is a surface street and alternatively a second carriageway of a second limited access road.

29. The method of claim 26, wherein the compound exit ramp comprises a first fork, the first fork further comprising a first left branch and a first right branch.

30. The method of claim 29, wherein the first left branch is a first road element that leads to a second fork having a second left branch and a second right branch and the first right branch is a second road element that leads to a third fork having a third left branch and a third right branch.

31. The method of claim 29, wherein the first left branch is a first leaf ramp that leads to a first destination roadway and the first right branch is a second leaf ramp that leads to a second destination roadway.

32. The method of claim 26, wherein the first name list comprises a route identifier and alternatively a primary street name, the route identifier and the primary street name being associated with a first road crossing a first distance ahead of the selected exit ramp.

33. The method of claim 32, wherein the first distance is adjustable to accommodate changes in a spacing between successive exit ramps.

34. The method of claim 26, wherein the second name list comprises a route identifier and alternatively a primary street name, the route identifier and the primary street name being associated with a second road crossing a second distance behind the selected exit ramp.

35. The method of claim 34, wherein the second distance is adjustable to accommodate changes in a spacing between successive exit ramps.

36. The method of claim 26, wherein the first process comprises the steps of:

determining whether the simple ramp is identified with a route identifier;

determining whether a street name or the route identifier identified with a first road element connected to an end of the simple ramp at a first junction matches an entry in the first and second name lists;

determining whether a second road element connected to the first road element at a second junction ahead of the first junction has a higher road class than the first road element; and determining whether traffic exiting the simple exit ramp can proceed in only one direction along the first road element.

37. The method of claim 26, wherein the compound ramp comprises a first fork comprising a first fork handle, a first left branch, and a first right branch and wherein the second process comprises the steps of:

(a) computing sign text for the branches which are leaf ramps;

(b) determining whether the sign texts computed for the left and right branches have a common name;

(c) placing the common name into the fork handle sign text if the sign texts computed for the left and right branches are equivalent;

(e) placing both sign texts into the fork handle sign text if the sign texts computed for the left and right branches are not equivalent;

(f) removing duplicate names from the fork handle sign text;

(g) merging different versions of a same route identifier or a same street name in the fork handle sign text into a general version of the route identifier and the street name; and (h) repeating steps (b) to (g) for other forks of the compound ramp.

38. The method of claim 26, further comprising the step of:

storing computed sign text for selected exit ramps from a first electronic map database containing the electronic map of roads into a second electronic map database.

39. The method of claim 26, further comprising the step of:

storing computed sign text for selected exit ramps of the electronic map of roads while the electronic map of roads is being created.

40. The method of claim 26, wherein sign text for respective exit ramps is sequentially outputted to a display of a system for determining a path from an origin to a destination in response to a user initiated pathfinding request.

41. The method of claim 40, wherein the sign text is computed and outputted in real-time in conjunction with the user initiated pathfinding request.

42. The method of claim 41, wherein sign text for a given exit ramp is outputted to the display until the user passes the given exit ramp, whereupon sign text for the given exit ramp is removed from the display and sign text for a next exit ramp is outputted to the display.

43. A processor readable storage medium having processor readable code embodied on the processor readable storage medium, the processor readable code for programming a processor to perform a method for determining sign text of exit ramps in an electronic map of roads from a first carriageway of a limited access road to a destination roadway, the method comprising the steps of:

constructing a first name list and a second name list;

computing sign text using a first process if the selected exit ramp is a simple exit ramp, a first name list and a second name list being inputs to the first process and the computed sign text being placed in the sign text variable;

computing sign text using a second process if the selected exit ramp is a compound exit ramp, the first and second name lists being inputs to the second process and the computed sign text being placed in the sign text variable; and outputting the sign text variable to a display.

44. The processor readable storage medium of claim 43, further comprising the step of:

storing the computed sign text in a database.

45. An apparatus for determining sign text of exit ramps in an electronic map of roads from a first carriageway of a limited access road to a destination roadway, the apparatus comprising:

an output device;

a processor, in communication with the output device; and a processor readable storage medium for storing code, the processor readable storage medium being in communication with the processor, the code capable of programming the processor to perform the steps of:

computing sign text using a first process if a selected exit ramp is a simple exit ramp, a first name list and a second name list being inputs to the first process and the computed sign text being placed in the sign text variable;

computing sign text using a second process if the selected exit ramp is a compound exit ramp, the first and second name lists being inputs to the second process and the computed sign text being placed in the sign text variable, and outputting the sign text variable to a display.

46. The apparatus of claim 45, wherein the code capable of programming the processor performs the additional step of:

storing the computed sign text in a database.

\* \* \* \* \*

UNITED STATES PATENT AND TRADEMARK OFFICE
CERTIFICATE OF CORRECTION

PATENT NO. : 6,559,865 B1
DATED : May 6, 2003
INVENTOR(S) : George T. Angwin It is certified that error appears in the above-identified patent and that said Letters Patent is hereby corrected as shown below:

Column 16,
Line 23, delete "(e)" and insert therefor -- (d) --
Line 26, delete "(f)" and insert therefor -- (e) --
Line 28, delete "(g)" and insert therefor -- (f) --
Line 32, delete "(h)" and insert therefor -- (g) --
Line 32, delete "(b) to (g)" and insert therefor -- (b) to (f) --

Signed and Sealed this

Thirteenth Day of April, 2004

JON W. DUDAS
*Acting Director of the United States Patent and Trademark Office*